United States Patent
Hofmann et al.

(10) Patent No.: US 8,480,307 B2
(45) Date of Patent: Jul. 9, 2013

(54) BALL ROLLER BEARING

(75) Inventors: Heinrich Hofmann, Schweinfurt (DE); Andreas-Johann Bohr, Herzogenaurach (DE); Ernst Geiger, Hallerndorf (DE); Otmar Weber, Pommersfelden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/496,599

(22) PCT Filed: Aug. 19, 2010

(86) PCT No.: PCT/EP2010/062106
§ 371 (c)(1),
(2), (4) Date: Mar. 16, 2012

(87) PCT Pub. No.: WO2011/032800
PCT Pub. Date: Mar. 24, 2011

(65) Prior Publication Data
US 2012/0177317 A1    Jul. 12, 2012

(30) Foreign Application Priority Data
Sep. 18, 2009 (DE) .......................... 10 2009 042 166

(51) Int. Cl.
*F16C 33/34* (2006.01)
*F16C 33/46* (2006.01)

(52) U.S. Cl.
USPC .......................................... 384/568; 384/572

(58) Field of Classification Search
USPC ......................... 384/491, 558, 568, 572–580
See application file for complete search history.

(56) References Cited

U.S. PATENT DOCUMENTS
2009/0180724 A1    7/2009   Hofmann

FOREIGN PATENT DOCUMENTS
DE    102008016977 A1    10/2009

*Primary Examiner* — Phillip A Johnson
(74) *Attorney, Agent, or Firm* — Lucas & Mercanti, LLP

(57) ABSTRACT

A ball roller bearing which has an outer and inner bearing ring and ball rollers arranged between the rings, which roll in groove-shaped tracks in the rings and are held at a uniform distance to one another by a window cage. The cage has two lateral angle ribs, pocket bridges, which connect the ribs and cage pockets separated by the pocket bridges. The pockets have a cross-shaped hole formed from a contour perpendicular to the circumferential direction and a cross-sectional contour of a ball roller arranged longitudinally to the circumferential direction. The side edges are formed from the pocket bridges, which have radii of arch-shaped guide surfaces corresponding to the running surfaces of two ball rollers. The pocket bridges have additional material profiling between the side edges and on the guide surfaces for axial stiffening of the cage and damping bearing noise.

3 Claims, 3 Drawing Sheets

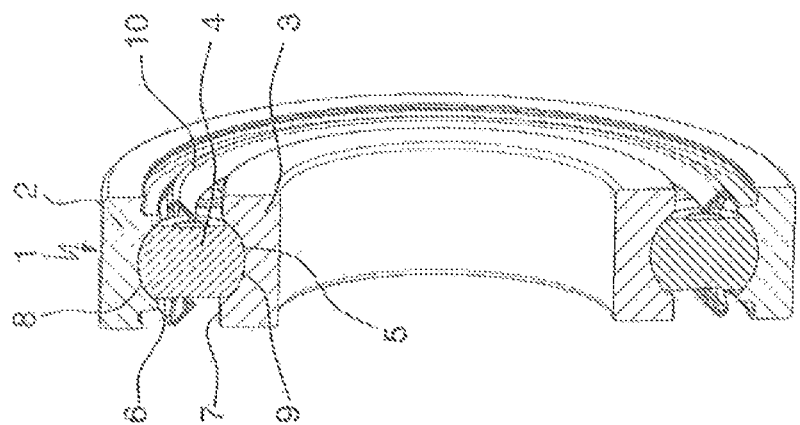
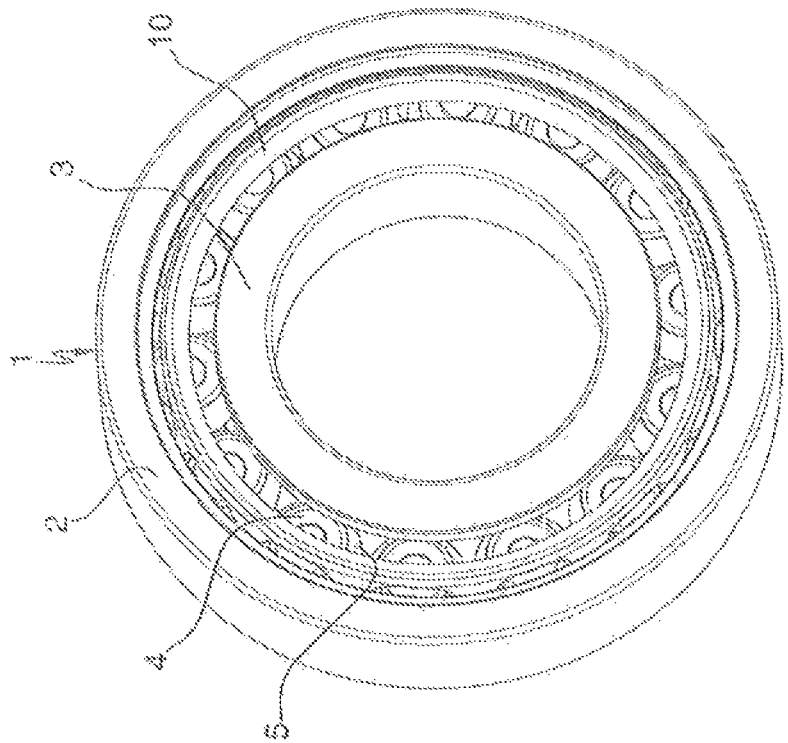
Fig. 2
Fig. 1

BALL ROLLER BEARING

CROSS-REFERENCE TO RELATED APPLICATIONS

This application is a 371 of PCT/EP2010/062106 filed Aug. 19, 2010, which in turn claims the priority of DE 10 2009 042 166.1 filed Sep. 18, 2009. The priority of both applications is hereby claimed and both applications are incorporated by reference herein.

FIELD OF THE INVENTION

The invention relates to a single-row ball roller bearing, which can be used to particular advantage as a fixed bearing for the input or output shaft of a motor vehicle shift transmission, for example.

BACKGROUND OF THE INVENTION

Ball roller bearings are rolling contact bearings with special rolling elements designed as ball rollers, which, starting from a basic ball shape, each have two side faces, which are formed as flats on said basic ball shape, which are arranged parallel to one another and between which the running surfaces of the ball rollers are in each case arranged. Ball roller bearings of this kind are widely known in many different versions in the form of single-row, two-row, three-row or even four-row radial or angular contact ball roller bearings and, owing to the special shape of the rolling elements, they also require special cage designs in order, on the one hand, to limit a maximum angular position of the ball rollers relative to the longitudinal axis of the bearing and, on the other hand, to avoid wobbling of the ball rollers transversely to the direction of revolution thereof.

A single-row ball roller bearing of the type in question is already known, for example, from the German patent application with the official file reference 10 2008 016 977.3, which had not yet been published on the filing date of the present patent application, and essentially comprises an outer bearing ring, an inner bearing ring and a multiplicity of ball rollers arranged between said bearing rings. The ball rollers roll on the running surfaces thereof in two groove-shaped races machined into the inner side of the outer bearing ring and into the outer side of the inner bearing ring and are held at uniform distances from one another in the circumferential direction by a bearing cage. This bearing cage is expediently designed as a window cage, which has two lateral angular flanges of identical diameter, a plurality of pocket webs which connect said angular flanges to one another, and a plurality of cage pockets which are separated from one another by said pocket webs and, in each case, have a capstan shape which is formed from a free contour which is arranged transversely with respect to the circumferential direction for inserting a ball roller into the bearing cage and from a cross-sectional contour of a ball roller; the cross-sectional contour is integrated in the former and is arranged longitudinally with respect to the circumferential direction. The free contour of the cage pockets, which is arranged transversely to the circumferential direction, corresponds to the shape of a section plane arranged directly on the transverse axis of a ball roller while the cross-sectional contour of the cage pockets, which is arranged longitudinally with respect to the circumferential direction, has the shape of a section plane arranged above the transverse axis of a ball roller, with the result that the side edges of the pocket webs are configured with the radii of the arcuate guide faces for the ball rollers, and the guide faces correspond to running surfaces of two adjacent ball rollers. To produce a bearing cage of this kind, use is generally made of a sheet-metal strip, which is finished by profiling the angular flanges, punching the cage pockets, cutting to length to give the dimension of the circumference, rolling into a ring and welding the ends of the ring.

It has been found in practice, however, that the production of the bearing cage in the form described is subject to special technical problems, and furthermore the function of the bearing cage does not fully meet the specified requirements in terms of quality. It has thus been determined that the high filling ratio of the ball roller bearing and the associated high number of cage pockets in the bearing cage necessarily lead to it being possible for the pocket webs which separate the cage pockets from one another to be of only very narrow configuration and to said pocket webs therefore having only a low axial flexural stiffness. As a result, during the flanging of the lateral angular flanges which concludes the bearing assembly, axial bulges of the pocket webs occur, which bulges can lead to the ball rollers jamming in their cage pockets and ultimately to malfunctions of the ball roller bearing. The low flexural stiffness of the pocket webs can likewise lead to high fluctuations in the cage deflection during bearing operation, as a result of which undesirable high bearing noise additionally occurs in conjunction with the sharp edges of the punched-out cage pockets.

SUMMARY OF THE INVENTION

Starting from the disadvantages explained of the known prior art, it is therefore the underlying object of the invention to design a ball roller bearing, which has a bearing cage that, while maintaining a maximum possible filling ratio of the ball roller bearing, has pocket webs, which are narrowly configured, that do not tend to form axial bulges during the concluding flanging of the lateral angular flanges and do not cause any undesirable bearing noise during bearing operation.

According to the invention, this object is achieved, by a ball roller bearing where the pocket webs have additional material profiles for axial reinforcement of the bearing cage, both between their side edges and on their guide faces, and the material profiles on their guide faces are configured at the same time as damping means against bearing noise.

Here, the invention is based on the finding that, as a result of targeted material profiles on the pocket webs of the bearing cage, a pocket geometry can be provided which firstly brings about a considerable axial reinforcement of the bearing cage and therefore avoids the axial bulges of the pocket webs, which axial bulges are produced during the concluding flanging of the lateral angular flanges, and which at the same time chamfers the sharp-edged guide faces on the cage pockets and therefore avoids undesirable bearing noise.

Thus, according to a first refinement of the invention, the material profiles between the side edges of the pocket webs are configured as beads which are machined longitudinally centrally into their surfaces. This has proven particularly advantageous, since the beads can therefore be produced in a virtually cost neutral manner in one work operation with the punching of the cage pockets out of the sheet metal strip. Moreover, it is advantageous if the beads do not extend over the full length of the pocket webs, but rather are configured so as to end on both sides at the transition region of the pocket webs to the lateral angular flanges, since the elasticity which is required once again in this transition region for the flanging of the lateral angular flanges which concludes the bearing assembly can therefore be obtained. However, it is also possible to machine the beads into the underside of the pocket webs and/or to arrange them outside the longitudinal center of the pocket webs.

Moreover, according to a second refinement of the invention, the material profiles on the guide faces of the pocket webs are configured as radially outwardly directed borders of material tabs which are additionally formed integrally onto the guide faces. Here, said material tabs are likewise produced with the punching of the cage pockets out of the sheet metal strip and are therefore likewise virtually cost-neutral. Here, the borders produced with said material tabs on the guide faces of the cage pockets contribute to the further axial reinforcement of the pocket webs of the bearing cage and at the same time have the further advantage that, as a result of the produced rigidity and as a result of the rounded profile of the guide faces which is produced, they act as damping means against the bearing noise produced during bearing operation during the forward and backward running of the ball rollers.

BRIEF DESCRIPTION OF THE DRAWINGS

A preferred embodiment of the ball roller bearing designed in accordance with the invention is explained in greater detail below with reference to the attached drawings, in which:

FIG. 1 shows an overall perspective view of a ball roller bearing designed in accordance with the invention;

FIG. 2 shows a perspective view of a cross section through the ball roller bearing designed in accordance with the invention and shown in FIG. 1;

DETAILED DESCRIPTION OF THE INVENTION

Figure 3:
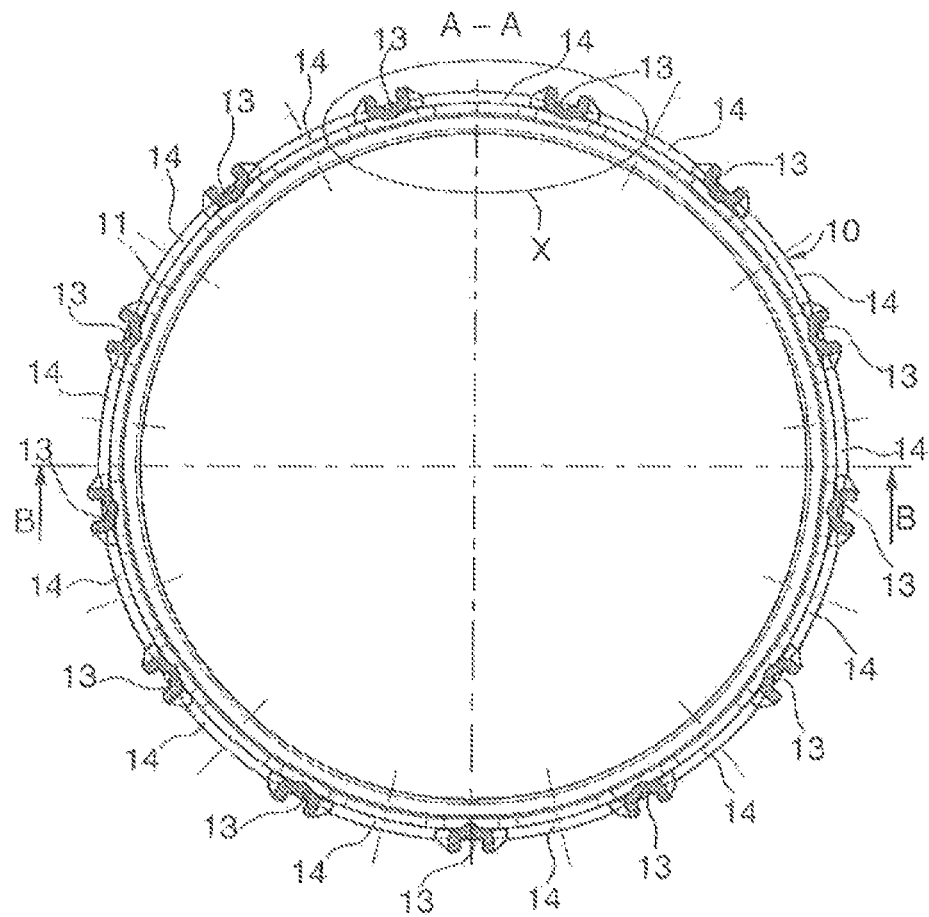
FIG. 3 shows the section A-A through the bearing cage of the ball roller bearing designed in accordance with the invention and shown in FIG. 4.
Figure 4:
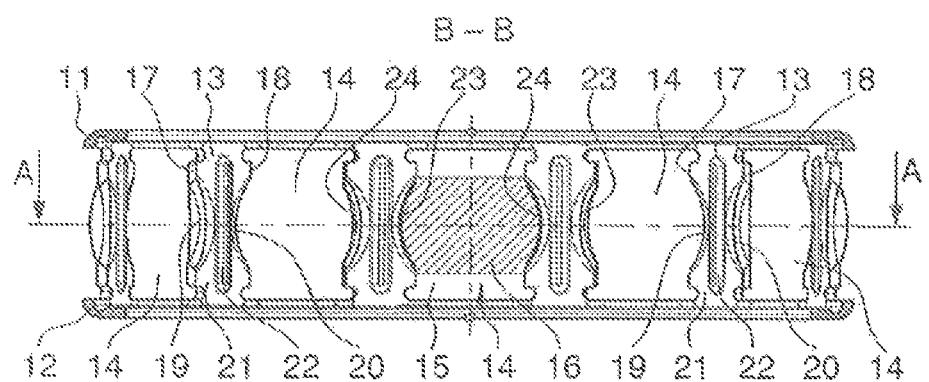
FIG. 4 shows the section B-B through the bearing cage of the ball roller bearing designed in accordance with the invention and shown in FIG. 3.

A ball roller bearing 1 is clearly apparent from FIGS. 1 and 2, and essentially comprises an outer bearing ring 2, an inner bearing ring 3 and a multiplicity of ball rollers 4 arranged between said bearing rings 2, 3. The ball rollers 4 roll on running surfaces 5 in two groove-shaped races 8, 9 machined into the inner side 6 of the outer bearing ring 2 and into the outer side 7 of the inner bearing ring 3 and the ball rollers 4 are held at uniform distances from one another in the circumferential direction by a bearing cage 10. As FIGS. 3 and 4 show, the bearing cage 10 is designed as a window cage, which has two lateral angular flanges 11, 12 of identical diameter, a plurality of pocket webs 13 which connect said angular flanges 11, 12 to one another, and a plurality of cage pockets 14 which are separated from one another by said pocket webs 13. The individual cage pockets 14 of the bearing cage 10 each clearly have a cross-hole shape, which, as illustrated in FIG. 4, is formed from a free contour 15, which is arranged transversely to the circumferential direction and is intended for the insertion of a ball roller 4 into the bearing cage 10, and from a cross-sectional contour 16 of a ball roller 4, which is integrated therein. The cross-sectional contour 16 is arranged longitudinally with respect to the circumferential direction and is illustrated by hatching with the result that the side edges 17, 18 of the pocket webs 13 are configured with the radii of the arcuate guide faces 19, 20 for the ball rollers 4. The guide faces 19, 20 correspond to the running surfaces 5 of two adjacent ball rollers 4.

Figure 5:
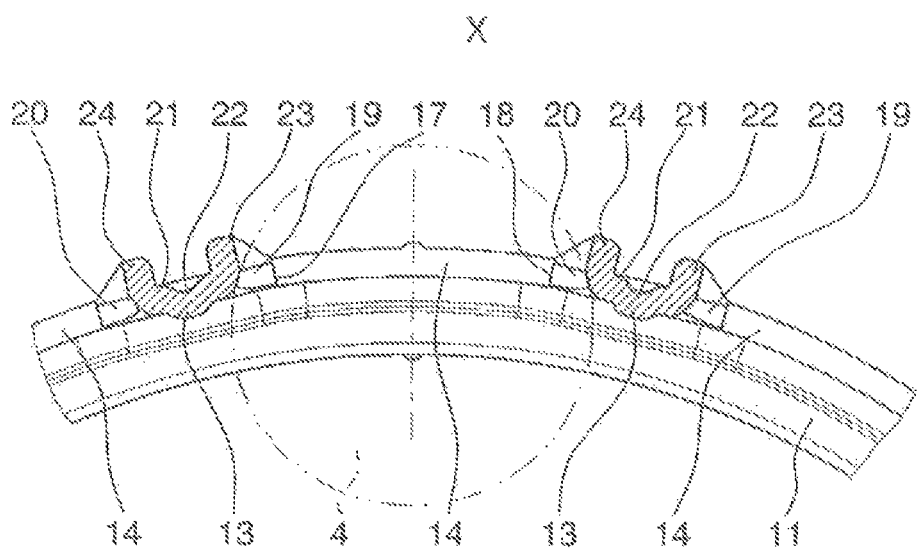
FIG. 5 shows an enlarged view of the detail X of the bearing cage of the ball roller bearing designed in accordance with the invention and shown in FIG. 3.

FIGS. 4 and 5 furthermore make clear that the pocket webs 13 have additional material profiles both between their side edges 17, 18 and on their guide faces 19, 20. The material profiles are provided for the axial reinforcement of the bearing cage 10 and as damping means against bearing noise. Here, the material profiles between the side edges 17, 18 of the pocket webs 13 are clearly visibly configured as beads 22 which are machined longitudinally centrally into their surfaces 21 and, as FIG. 4 shows, do not extend over the full length of the pocket webs 13, but rather end on both sides at the transition region of the pocket webs 13 to the lateral angular flanges 11, 12 in order thus to obtain the elasticity which is required in this transition region for the flanging of the lateral angular flanges 11, 12 which concludes the bearing assembly. In contrast, the material profiles on the guide faces 18, 19 of the pocket webs 13 are configured as radially outwardly directed borders 23, 24 of additional material tabs which are formed integrally onto the guide faces 19, 20, contribute to the further axial reinforcement of the pocket webs 13 of the bearing cage 10 and at the same time have the further advantage that, as a result of the produced rigidity and as a result of the chamfered profile of the guide faces 18, 19 which is produced, they act as damping means against the bearing noise produced during bearing operation during the forward and backward running of the ball rollers 4 indicated by dash-dotted lines in FIG. 5.

List of Reference Signs

| | |
|---|---|
| 1 | Ball Roller Bearing |
| 2 | Outer Bearing Ring |
| 3 | Inner Bearing Ring |
| 4 | Ball Rollers |
| 5 | Running Surfaces |
| 6 | Inner Side of 2 |
| 7 | Outer Side of 3 |
| 8 | Race in 6 |
| 9 | Race in 7 |
| 10 | Bearing Cage |
| 11 | Angular Flange |
| 12 | Angular Flange |
| 13 | Pocket Webs |
| 14 | Cage Pockets |
| 15 | Free Contour in 14 |
| 16 | Cross-Sectional Contour of 4 in 14 |
| 17 | Side Edge of 13 |
| 18 | Side Edge of 13 |
| 19 | Guide Face on 17 |
| 20 | Guide Face on 18 |
| 21 | Surface of 13 |
| 22 | Beads in 21 |
| 23 | Border on 19 |
| 24 | Border on 20 |

The invention claimed is:
1. A ball roller bearing, comprising:
an outer bearing ring having a first groove-shaped race machined into an inner side of the outer bearing ring;
an inner bearing ring having a second groove-shaped race machined into an outer side of the inner bearing ring; and
a plurality of ball rollers arranged between the bearing rings, the ball rollers have running surfaces and roll between the first groove-shaped race of the outer bearing ring and the second groove-shaped race of the inner bearing ring; and a bearing cage arranged to hold the ball rollers at uniform distances from one another in a circumferential direction, wherein the bearing cage is a window cage having two lateral angular flanges of identical diameter, a plurality of pocket webs that connect the angular flanges to one another and form a plurality of cage pockets that are separated from one another by the pocket webs and have a capstan shape which is formed from a free contour that is arranged transversely with respect to the circumferential direction for inserting the ball rollers into the bearing cage and from a cross-sectional contour of the ball rollers, the cross-sectional contour is integrated in the free contour and is arranged longitudinally with respect to the circumferential direction, wherein the pocket webs have side edges configured with radii of arcuate guide faces for the ball rollers by the capstan shape of the cage pockets, wherein the guide faces correspond to the running surfaces of two adjacent ball rollers, and wherein the pocket webs have additional material profiles for an axial reinforcement of the bearing cage, both between the side edges and on the guide faces, and the material profiles on the guide faces are simultaneously configured to dampen against bearing noise.

2. The ball roller bearing as claimed in claim 1, wherein the material profiles between the side edges of the pocket webs are beads machined longitudinally centrally into surfaces of the pocket webs.

3. The ball roller bearing as claimed in claim 1, wherein the material profiles on the guide faces of the pocket webs are radially outwardly directed borders of material tabs which are additionally formed integrally on the guide faces.

* * * * *